United States Patent
Lee et al.

(10) Patent No.: US 9,529,137 B2
(45) Date of Patent: Dec. 27, 2016

(54) DISPLAY DEVICE

(71) Applicant: SAMSUNG ELECTRONICS CO., LTD., Suwon-si (KR)

(72) Inventors: Kil Hong Lee, Seongnam-si (KR); Dae Hee Lee, Hwaseong-si (KR); Sin Wook Hyung, Busan (KR); Young Man Ahn, Suwon-si (KR); Hyeong Sik Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 14/284,963

(22) Filed: May 22, 2014

(65) Prior Publication Data
US 2014/0347840 A1  Nov. 27, 2014

(30) Foreign Application Priority Data

May 23, 2013 (KR) .................. 10-2013-0058532

(51) Int. Cl.
*F21V 8/00* (2006.01)

(52) U.S. Cl.
CPC ............. *G02B 6/005* (2013.01); *G02B 6/0038* (2013.01); *G02B 6/0061* (2013.01); *G02B 6/0036* (2013.01); *G02B 6/0056* (2013.01); *G02B 6/0065* (2013.01); *G02B 6/0088* (2013.01)

(58) Field of Classification Search
CPC .... G02B 6/0051; G02B 6/0061; G02B 6/0036
USPC .................................. 362/609, 634
See application file for complete search history.

(56) References Cited

U.S. PATENT DOCUMENTS

2008/0303979 A1* 12/2008 Shimizu ............... F21V 7/05
                                                    349/65
2014/0347840 A1* 11/2014 Lee .................. G02B 6/005
                                                    362/19

FOREIGN PATENT DOCUMENTS

DE   20 2013 100 049 U1   1/2013
EP      2 267 498 A2     12/2010
KR   10-2012-0067776 A    6/2012

OTHER PUBLICATIONS

Communication, Issued by the European Patent Office, Dated Oct. 7, 2014, In counterpart European application No. 14158582.8.

* cited by examiner

*Primary Examiner* — Anabel Ton
(74) *Attorney, Agent, or Firm* — Sughrue Mion, PLLC

(57) ABSTRACT

A display device includes a display panel, a backlight unit configured to output light to the display panel, and a lens part interposed between the display panel and the backlight unit, and configured to transmit the light output from the backlight unit is transmitted, wherein the backlight unit includes an optical module configured to output the light, and a light guide plate configured to form a light path through which the light that is output from the optical module and incident on the light guide plate is transmitted and to scatter the incident light, the light guide plate including a fixing hole, a first pattern part configured to scatter the incident light output from the optical module, and a second pattern part provided adjacent to the fixing hole.

31 Claims, 10 Drawing Sheets

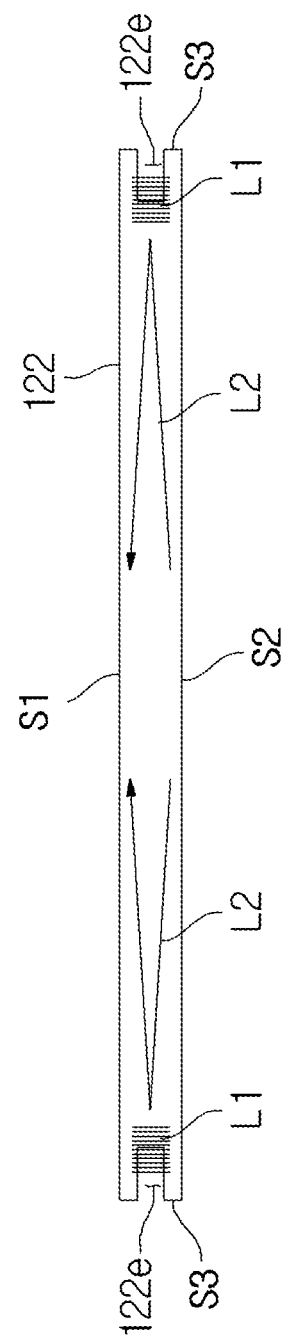

DISPLAY DEVICE

CROSS-REFERENCE TO RELATED APPLICATION

This application claims priority from Korean Patent Application No. 10-2013-0058532, filed on May 23, 2013 in the Korean Intellectual Property Office, the disclosure of which is incorporated herein by reference in its entirety.

BACKGROUND

1. Field

Apparatuses consistent with exemplary embodiments of the present disclosure relate to a display device having a light guide plate providing uniform brightness.

2. Description of the Related Art

In general, a display device is a device configured to display visual image information in a three-dimensional form.

In recent years, various types of flat panel display devices, including flat panel display devices which are less restricted in terms of the required installation space while also achieving thickness reduction and weight reduction, which are hard conditions to meet in a cathode ray tube display devices, are being developed. These flat panel display devices may also have other benefits, such as good representation of a large scale screen and flatness, and a high quality.

Representative examples of the flat panel display devices include a liquid crystal display (LCD), an electro-luminescence display (ELD), a field emission display (FED), a plasma display panel (PDP), a thin film transistor-LCD (TFT-LCD), and a flexible display.

Among these, the LCD is increasingly being used in various areas, such as a slim television, a slim monitor, and a slim portable display due to the low weight, low power consumption, and a thin thickness thereof.

A light receiving type flat panel display, such as an LED or a Light Box, is a display in which liquid crystals having properties between liquid and solid are injected between two glass panels having a thin thickness and the alignment of the liquid crystals is changed by supplying power to cause a contrast and display an image. Different from the PDP, FED, and organic ELD, the LCD is a non-emissive type element (a light receiving element), and thus requires an additional light emitting device for operation. Accordingly, there is a need for a backlight unit in the form of a surface light source capable of maintaining uniform brightness on the entire screen.

That is, the LCD displays an image by use of light emitted from a backlight unit.

The backlight unit may be a direct-type backlight unit having a light emitting device arranged at a lower surface of a liquid crystal panel to emit light from the light emitting device, or an edge-type light backlight unit having a light emitting device installed at one end of a light guide plate installed at a lower side of a liquid crystal panel to emit light from the light emitting device.

As a scanning technology is applied to the edge-type backlight unit, and a pattern having a prism shape or a lenticular shape is formed on an upper portion of a light guide plate of the backlight unit such that light travels straightforward, a high quality three-dimensional image is represented on the LCD.

Such an edge-type backlight unit has a shortcoming of a light bouncing phenomenon at a fixing hole formed in a light guide plate. In the conventional technology, in order to address such a light bouncing phenomenon, a black taping process is performed by attaching black tape to a surface having the fixing hole.

For this reason, an additional expense incurs due to purchasing the black tape, and the manufacturing process is complicated due to the taping process.

In addition, in the trend of developing larger scale display devices, the number of fixing holes is increased, and thus a region between the two fixing holes is blocked from light, making a dark portion. In addition, the straightforward path of light becomes difficult to achieve, and light bouncing occurs, so that the brightness of the light guide plate is less uniform.

SUMMARY

One or more exemplary embodiments provide a display device having a lens part formed on a first surface of a light guide plate and a double pattern part formed on a second surface of the light guide plate.

One or more exemplary embodiments also provide a display device having a straight line laser pattern processed at a region adjacent to a fixing hole of a light guide plate.

In accordance with an aspect of an exemplary embodiment, there is provided a display device including a display panel, a backlight unit, and a lens part. The backlight unit may be configured to output light to the display panel. The lens part may be interposed between the display panel and the backlight unit, and configured to transmit the light output from the backlight unit. The backlight unit may include an optical module and a light guide plate. The optical module may be configured to output the light. The light guide plate may be configured to form a light path through which the light that is output from the optical module and incident on the light guide plate is transmitted and to scatter the incident light, and may include a fixing hole, a first pattern part configured to scatter the incident light output from the optical module, and a second pattern part provided adjacent to the fixing hole.

The light guide plate may include a first region adjacent to the fixing hole and a second region excluding the first region such that light is scattered from the first region at an amount that is different than an amount that light is scattered from the second region.

The second pattern part may be configured to reduce an amount of light propagating toward the fixing hole from a light incident surface of the light guide plate adjacent to the optical module, to thereby prevent a light bouncing phenomenon at the fixing hole.

The first pattern part may be configured to scatter the incident light. The second pattern part may be configured to scatter, reflect and absorb light incident to the fixing hole.

The fixing hole may be provided on an edge of the light guide plate other than an edge adjacent to the optical module among a plurality of edges of the light guide plate.

The second pattern part may be a pattern provided along the edge having the fixing hole.

The first pattern part and the second pattern part may include depressions in a surface of the light guide plate. The depressions of the second pattern part may have a depth that is deeper than a depth of the depressions of the first pattern part.

The first pattern part and the second pattern part may be formed by laser processing.

The first pattern part may include a plurality of dot type patterns. The second pattern part may include a plurality of straight line type patterns.

The second pattern part may include straight line type patterns having a density which increases from a light incident surface at which the light output from the optical module is incident toward a region adjacent to the fixing hole.

The second pattern part may be formed by performing the laser-processing at a speed slower than a speed at which the first pattern part is formed by performing the laser-processing.

The backlight unit may further include a reflector sheet configured to reflect the light output from the optical module toward the light guide plate.

The first pattern part and the second pattern part may be provided on a surface adjacent to the reflector sheet among surfaces of the light guide plate.

The display device may further include a prism sheet. The prism sheet may be disposed between the backlight unit and the display panel and may be configured to collect light output from the backlight unit.

The display device may further include a reflective polarizing sheet. The reflective polarizing sheet may be disposed between the backlight unit and the display panel and may be configured to reflect a portion of the light output toward the display panel and to transmit the reflected light toward the display panel.

The second pattern part may have an area that is larger than an area in which the fixing hole is depressed in the light guide plate.

In accordance with an aspect of another exemplary embodiment, there is provided a display device including an edge-type backlight unit including a light guide plate and an optical module. The light guide plate may include a base part, a lens part, a first pattern part and a second pattern part. The base part may include a first surface, a second surface opposite to the first surface, a plurality of lateral side surfaces surrounding the first surface and the second surface, and a fixing hole provided on a first lateral side surface among the plurality of lateral side surfaces, wherein the fixing hole may include a depression in the first lateral side surface and may extend from the first surface to the second surface, and the optical module may be disposed at a second lateral side surface among the plurality of lateral side surfaces. The lens part may be disposed on the first surface of the base part. The first pattern part may be provided on the second surface of the base part. The second pattern part may be provided at a region adjacent to the fixing hole, on the second surface of the base part.

The first lateral side surface may be different from the second lateral side surface. The second pattern part may include a straight line pattern provided at a periphery of the second surface adjacent to the first lateral side surface.

A length of the second lateral side surface is shorter than a length of the first lateral side surface.

The light guide plate may include a third lateral side surface opposite the first lateral side surface and a fourth lateral side surface opposite the second lateral side surface, and the fixing hole may be formed plurally in each of the first and third lateral side surfaces.

The plurality of fixing holes may be formed at center positions of each of the first and third lateral side surfaces and may be spaced apart from one another in the each of the center positions.

The second pattern part may be formed at edges adjacent to the first lateral side and the second surface and the third lateral side and the second surface, respectively, and may be formed to have a higher density in a region adjacent to the fixing hole compared to other regions of the light guide plate.

The first pattern part may be formed by moving a laser apparatus disposed adjacent to the second surface of the light guide plate at a first speed. The second pattern part may be formed by moving the laser apparatus at a second speed slower than the first speed.

The second pattern part may be formed at a first region of the light guide plate adjacent to the fixing hole formed in the light guide plate. The first pattern part may be formed at the first region and a second region of the light guide plate excluding the first region.

The second pattern part may be provided at a first region of the light guide plate adjacent to the fixing hole formed in the light guide plate. The first pattern part may be provided at a second region of the light guide plate excluding the first region.

The first pattern part may be configured to scatter light incident from the optical module. The second pattern part may be configured to scatter, reflect and absorb incident to the fixing hole and may form a light path for the light being incident from the optical module.

The second pattern part may be configured to reduce an amount of light propagating toward the fixing hole from a light incident surface of the light guide plate adjacent to the optical module, thereby preventing a light bouncing phenomenon at the fixing hole.

BRIEF DESCRIPTION OF THE DRAWINGS

The above and/or other aspects will become apparent and more readily appreciated from the following description of exemplary embodiments, taken in conjunction with the accompanying drawings of which:

FIGS. 7A and 7B are drawings illustrating an example of a light path of a pattern part of the display device in accordance with an exemplary embodiment;

DETAILED DESCRIPTION

Figure 1:
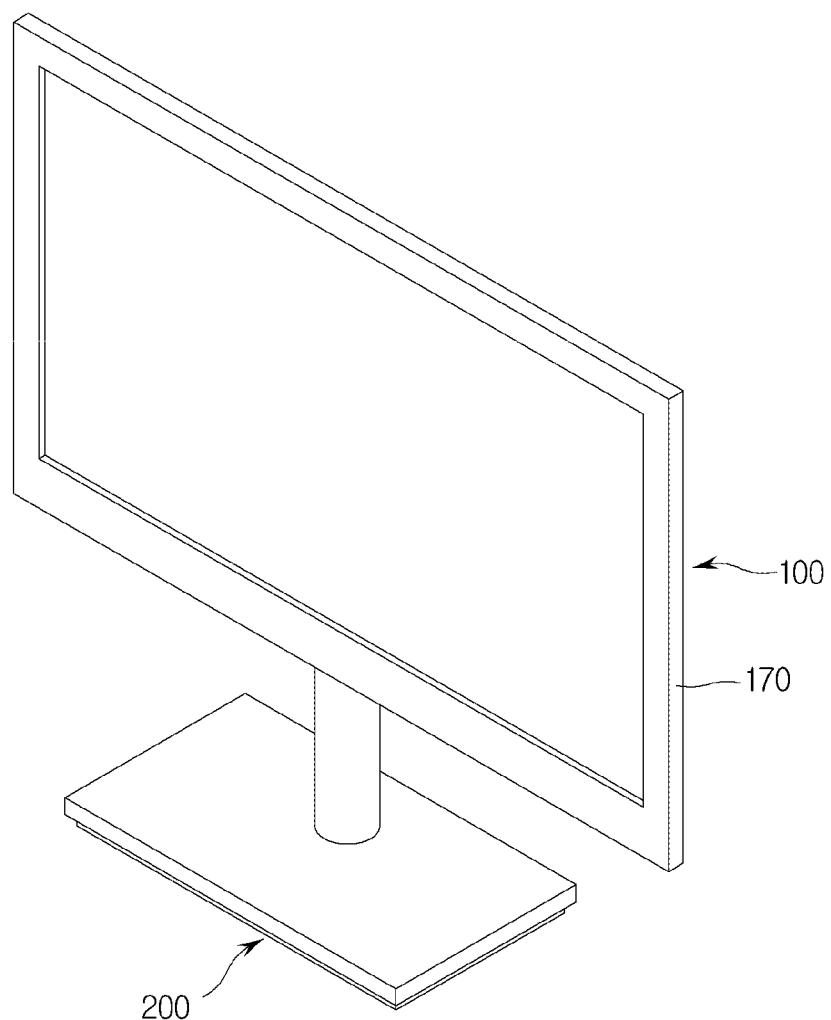
FIG. 1 is a drawing illustrating an example of a display device in accordance with an exemplary embodiment.

Reference will now be made in detail to the exemplary embodiments, examples of which are illustrated in the accompanying drawings, wherein like reference numerals refer to like elements throughout.

Figure 2:
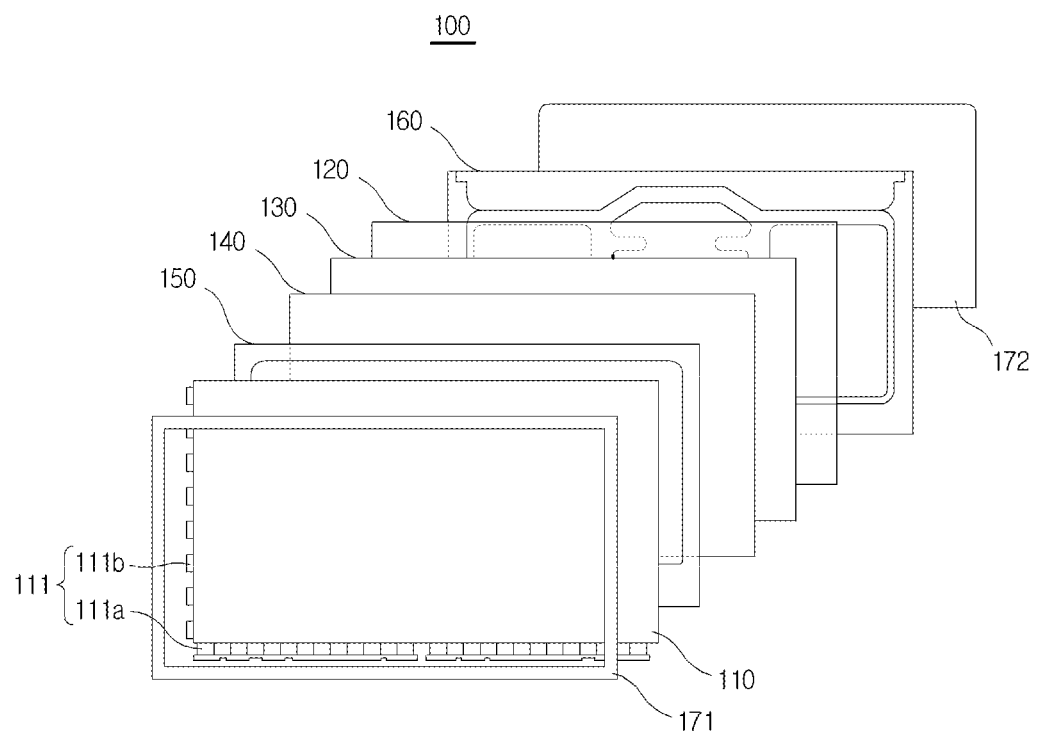
FIG. 2 is an exploded perspective view illustrating the display device in accordance with an exemplary embodiment.
Figure 3:
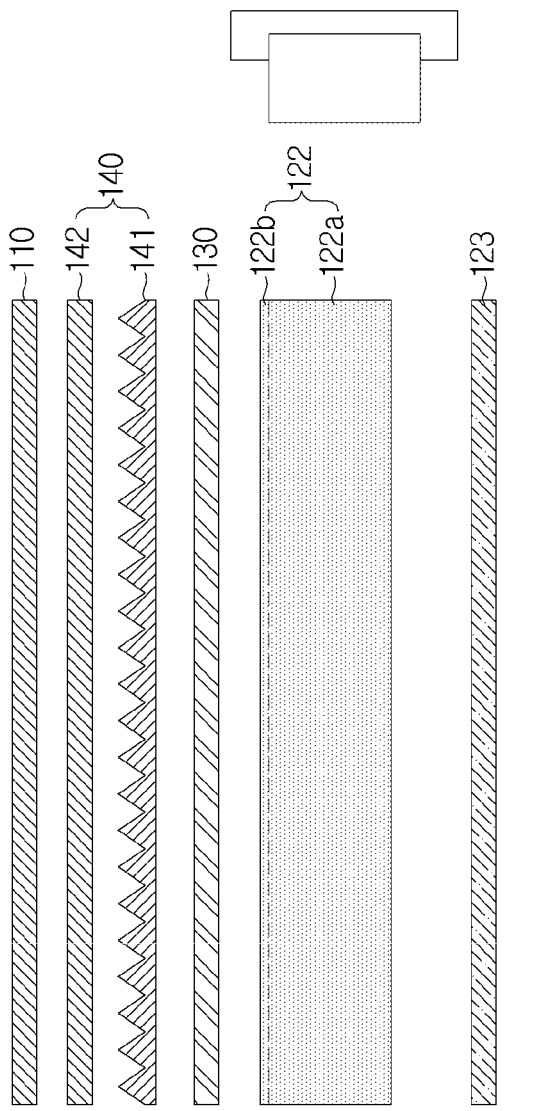
FIG. 3 is a cross sectional view illustrating the display device in accordance with an exemplary embodiment.

FIG. 1 is a drawing illustrating an example of a display device in accordance with an exemplary embodiment, FIG. 2 is an exploded perspective view illustrating the display device in accordance with an exemplary embodiment, and FIG. 3 is a cross sectional view illustrating the display device in accordance with an exemplary embodiment.

A display device 100 is a device configured to display an image, for example, a television, a monitor and a display device of a mobile communication terminal.

Referring to FIG. 1, the display device 100 displays an image and outputs sound. The sound may be output through an external device.

The display device 100 is supported by a stand 200 mounted at a lower end of the display device 100, or may be installed on a wall by a bracket and the like.

In the following description in accordance with an exemplary embodiment, a liquid crystal display (LCD) will be described as an example of a display device that displays an image through a display panel by adjusting the amount of transmission of light emitted from a backlight unit without emitting light itself.

Referring to FIG. 2, the LCD 110 includes a display panel 110, a backlight unit 120, a diffuser plate 130, optical sheets 140, a support member 150, a sash 160, and a housing 170 (171 and 172). These elements will be described with reference to FIG. 3.

The display panel 110 is a panel configured to display image information, such as text, numbers, and icons, by adjusting transmittance of light passing through a liquid crystal layer. According to an exemplary embodiment, the display panel 110 may be a large scale panel having a size of about 60 inches, although it is understood that the display panel 110 may be larger or smaller than 60 inches according to other exemplary embodiments. The transmittance of light passing through the liquid crystal layer is adjusted by the intensity of voltage applied.

The display panel 110 includes a color filter panel, a thin film transistor array (TFT) panel 112 and a sealant 113. According to an exemplary embodiment, each of the color filter panel and the TFT panel 112 is formed of glass. It is understood that the color filter panel and TFT panel 112 may be formed of other materials, e.g., plastic.

The color filter panel includes a red color filter, a green color filter and a blue color filter that are formed regions corresponding to respective pixel electrodes of the TFT panel 112. In addition, a common electrode made of transparent conductive material, such as an Indium Tin Oxide (ITO) or an Indium Zinc Oxide (IZO), is formed on the color filter panel.

The TFT panel 112 of the display panel 110 is disposed to be spaced apart from the color filter panel, and includes a plurality of gate lines, a plurality of data lines and a plurality of pixel electrodes.

The gate lines are disposed in a row direction to transmit a gate signal, the data lines are disposed in a column direction to transmit a data signal, and the pixel electrode is connected to the gate line and the data line and includes a switching device and a sustain capacitor.

According to an exemplary embodiment, the switching device is formed at an intersection of the gate line and the data line, and the sustain capacitor has one terminal connected to an output terminal of the switching device.

The other terminal of the sustain capacitor is connected to a common voltage or the gate line.

The display panel 110 further includes a liquid crystal layer 114 disposed between the color filter panel and the TFT panel 112. The liquid crystal panel 114 includes sealing material and liquid crystals accommodated in the sealing material.

The liquid crystal layer 114 has an alignment direction changed according to a voltage applied to the outside, thereby adjusting transmittance of light passing through the liquid crystal layer 114.

According to an exemplary embodiment, the color filter panel, the TFT panel 112 and the liquid crystal layer 114 of the display panel 110 form a liquid crystal capacitor in cooperation with one another, and the liquid crystal capacitor formed as such is connected to an output terminal and to a common voltage or a reference voltage.

The sealant 113 is formed at peripheries of the color filter panel and the TFT panel 112 of the display panel 110, and serves to couple the color filter panel to the TFT panel 112. The sealant 113 enables the display panel 110 to maintain its shape.

The display panel 110 further includes an image driver part 111.

The image driver part 111 includes a first driver part 111a driving an X-electrode, and a gate driver part 111b driving a Y-electrode. The X-electrode is a source electrode, and the Y-electrode is a gate electrode. The first driver part 111a and the second driver part 111b are connected to a driving module (not shown).

The first driver part 111a selects a gray scale voltage for each data line based on image data, and transmits the selected gray scale voltage to the liquid crystal through the data line.

The second driver part 111b transmits an ON/OFF signal based on the image data to a thin film transistor (TFT), that is, a switching device, through a scan line, to turn on and off the TFT.

That is, if a voltage corresponding to each color value is supplied by the first driver part 111a, the second driver part 111b receives the voltage and connects the voltage to a corresponding pixel.

The source electrode is connected to the data line, the gate electrode is connected to the scan line, and a drain electrode of the TFT is connected to the pixel electrode. Such a TFT, when a scan signal is supplied to a scan line, is turned on and supplies a data signal from a data line.

A predetermined voltage is applied to the common electrode, and thus an electric field is formed between the common electrode and the pixel electrode. Due to the electric field, an alignment angle of the liquid crystal of the liquid crystal panel is changed, and based on the changed alignment angle, the light transmittance is changed such that a desired image is displayed.

The driving module (not shown) provides a gate drive signal and a data drive signal based on a data control signal and a data signal to the gate line and the data line formed on the TFT panel 112, thereby implementing a desired image on the display panel 110. This feature will be described in detail below.

The backlight unit 120 is a light source device configured to emit light from a lateral side of the display panel 110, and represents an edge type LED light source device.

The backlight unit 120 includes a plurality of optical modules 121 (e.g., 121-1 and 121-2), and a light guide plate 122 and a reflector sheet 123 that are disposed between the optical modules 121.

Referring to FIG. 3, the optical module 121 includes a light source part 121a configured to output light, and an optical driver part 121b configured to drive the light source part 121a to output light from the light source part 121a.

According to an exemplary embodiment, the light source part 121a may be a light emitting diode configured to emit light at a high efficiency and low power consumption. The optical driver part 121b may be configured to block or adjust power being supplied to the light emitting diode, and may be implemented as a printed circuit board (PCB) having a plurality of light emitting diodes electrically mounted thereon.

The light guide plate 122 is configured to guide incident light to the display panel 110. According to an exemplary embodiment, the light guide plate 122 is formed of plastic material, such as polymethylmethacrylate (PMMA) of a transparent acryl-based resin having light transmitting characteristics, or a polycarbonate (PC) based material in the form of a plate. It is understood that the light guide plate 122 may be formed of other plastic and non-plastic materials according to other exemplary embodiments.

Such a light guide plate 122 induces diffusion of light with a superior transparency, weather resistance, and colorability.

The reflector sheet 123 is disposed between the light guide plate 122 and the cover 172, and reflects light provided at a lateral side surface of the light guide plate 122 toward a lateral side surface or toward a lens part 122b.

Such an edge type backlight unit 120 will be described later in detail.

The diffusion plate 130 is a semi-transparent panel located between the display panel 110 and the backlight unit 120, and is configured to diffuse light in the shape of a plane of the diffusion plate 130 such that color and brightness are seen to be uniform all over the screen. In this manner, the diffusion plate 130 improves the light emitted from the backlight unit 120 and supplies the light having the improved brightness to the display panel 110.

That is, the diffusion plate 130 makes the light of the LED of the backlight unit 120 wider, and maintains the brightness of the entire surface of the diffusion plate 130 to be uniform.

The optical sheets 140 represent sheets disposed between the display panel 110 and the diffusion plate 130, and include a prism sheet 141 having a prism formed thereon, and a reflective polarizing sheet 142, for example, a dual brightness enhancement film (DBEF) coated in multilayer for double refraction.

The prism sheet 141 includes a prism pattern having a triangular prism shape, and the prism pattern is provided in a plurality thereof arranged adjacent to each other in the form of band shapes or some other type of shapes.

That is, according to an exemplary embodiment, the prism patterns 141 are arranged in columns while having a hill shape and a valley shape alternating with each other, protruding toward the display panel 110 from a reference surface.

In addition, the prism patterns of the prism sheet 141 are disposed to perpendicularly cross lens patterns of the lens part of the light guide plate 122.

The reflective polarizing sheet 142 reflects some of the light that is to be absorbed by a polarizing plate (not shown) disposed at a front surface and a rear surface of the display panel 110, and provides the reflected light to the polarizing plate again.

To be specific, the reflective polarizing sheet 142 allows some of the incident light to pass therethrough, and reflects the remaining light. The reflected light is recycled by the diffusion sheet 130 and the prism sheet 141 as scattering light, and some of the recycled scattering light passes through the reflective polarizing sheet 142 again and the remaining portion thereof is reflected, thereby repeating such a recycling of light. As a result, the optical loss is minimized.

That is, the reflective polarizing sheet 152 recycles light that fails to pass through the polarizing plate, thereby enhancing the optical efficiency.

Such optical sheets 140 provide the display panel 110 with light having optical characteristics which are improved by enabling the brightness of light output from the light guide plate 122 to be uniform, and by diffusing light or collecting high brightness light.

The support member 150 supports the display panel 110, the diffusion plate 130, the optical sheets 140 and the sash 160 that are disposed between the bezel 171 and the cover 172.

In addition, the support member 150 maintains a distance between the display panel 110 and the optical sheets 140, a distance between the diffusion plate 130 and the optical sheets 140, and a distance between the diffusion plate 130 and the backlight unit 120.

The sash 160 is a panel configured to connect various components required for displaying an image and outputting sound, and has various types of printed circuit boards and input/output apparatuses mounted thereon.

Such a sash 160 is typically formed of metal having superior thermal resistance and strength, although is not limited to being formed of metal.

The sash 160 has a driving module (not shown) disposed thereon to drive the display panel 110 and the backlight unit 120.

The housing 170 includes the bezel 171 and the cover 172.

According to an exemplary embodiment, the bezel 171 forms a receiving space while being coupled to the cover 172. The display panel 110, the backlight unit 120, the diffusion plate 130, the optical sheets 140 and the sash 160 are disposed in the receiving space.

Figure 4:
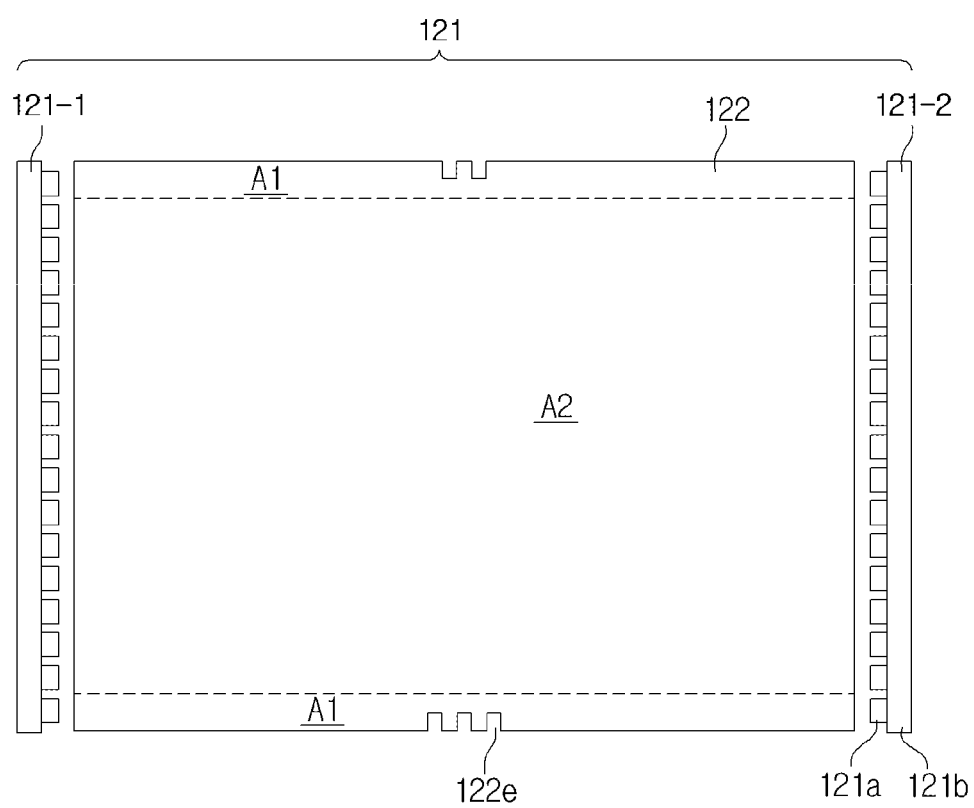
FIG. 4 is a plane view illustrating a backlight unit provided in the display device in accordance with an exemplary embodiment.

FIG. 4 is a plane view illustrating a backlight unit provided in the display device in accordance with an exemplary embodiment.

The first optical module 121-1 and the second optical module 12102 are disposed at two opposite lateral side surfaces of the light guide plate 122 of the backlight unit 120, respectively, and a plurality of fixing holes 122e are formed in the remaining opposite two lateral side surfaces.

The plurality of fixing holes 122e are holes into which a screw or other fastening device may be inserted and coupled such that the light guide plate 122 may be fixed to the cover 172.

That is, in order to stably fix the light guide plate 122 provided in a large scale to the cover 172, for example, when the light guide plate 122 is 60 inches or larger, the fixing holes 122e are formed in plural numbers in the light guide plate 122.

Two or more of the fixing holes 122e may be formed for each long edge. In this case, two or more fixing holes formed on one of the long edges are formed at the center of the long edge of the light guide plate 122 while being spaced apart from one another.

The light guide plate 122 includes a first region A1 adjacent to the fixing hole 122e wand includes the opposite two lateral side surfaces on which the optical modules 121-1 and 121-2 are not disposed, and a second region A2 which is a remaining portion of the light guide plate 122 excluding the first region A1.

Light output from the plurality of optical modules 121 (e.g., 121-1 and 121-2) is incident onto the first region A1 and the second region A2 of the light guide plate 122.

The light guide plate 122 further includes a pattern part provided plurally (e.g. in double) to prevent reflection from occurring on a boundary surface of the lateral side surfaces of the light guide plate 122, on which the optical modules 121-1 and 121-2 are not disposed, while preventing the brightness of the first region A1 from being represented to be different from the brightness of the second region A2 due to the light bouncing and dark portion generated at a boundary surface forming the fixing holes 122e. This feature will be described in detail with reference to FIG. 5.

Figure 5:
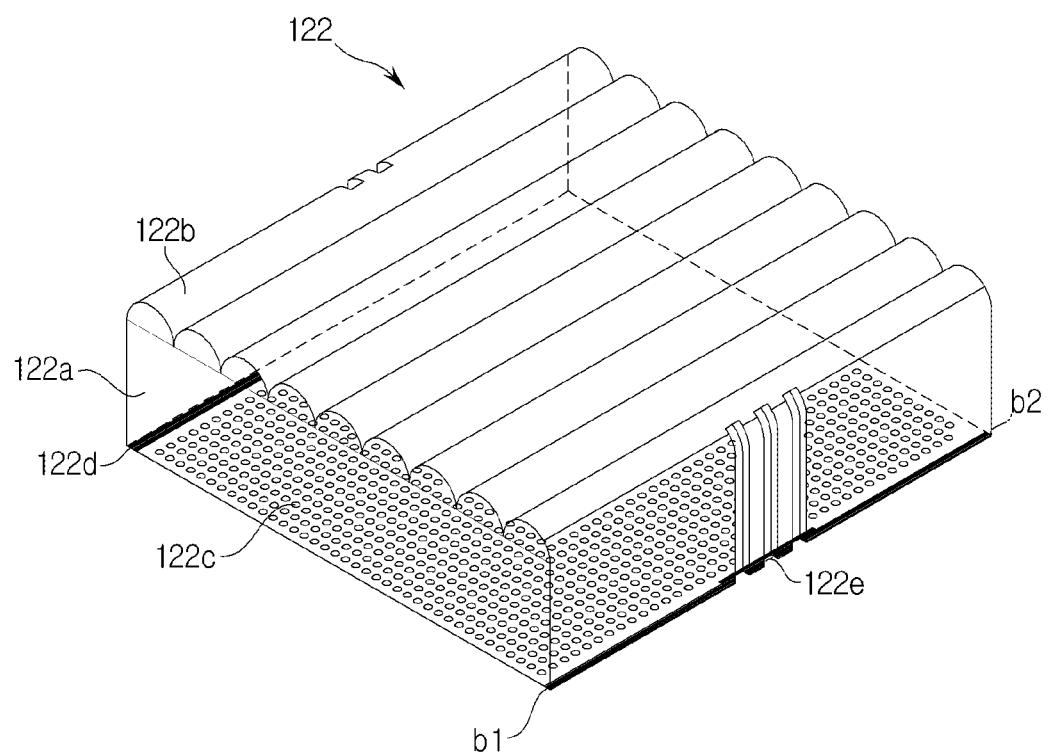
FIG. 5 is a perspective view illustrating a light guide plate of the backlight unit provided in the display device in accordance with an exemplary embodiment.

FIG. 5 is a perspective view illustrating a light guide plate of the backlight unit provided in the display device in accordance with an exemplary embodiment. This light guide plate will be described in conjunction with FIGS. 6A and 6B and FIGS. 7A and 7B.

Referring to FIG. 5, the light guide plate 122 includes a base part 122a and a lens part 122b formed at one surface of the base part 122a, and further includes a first pattern part 122c, a second pattern part 122d and the fixing hole 122e that are formed at another surface of the base part 122a.

According to an exemplary embodiment, the surface of the base part 122a on which the first pattern part 122c and the second pattern part 122d are formed is an opposite surface to the surface on which the lens part 122b is disposed.

The base part 122a includes a first surface and a second surface corresponding to an upper surface and a lower surface, respectively, and lateral side surfaces including four lateral side surfaces surrounding the first surface and the second surface.

The lens part 122b is formed on the first surface, which is the upper surface of the base part 122a, and includes a plurality of lens patterns disposed adjacent to each other in the shape of bands. According to an exemplary embodiment, the plurality of lens patterns forms a plurality of valleys and a plurality of hills, and the hill is a rounded shape which protrudes toward the display panel 110 from the first surface.

Such a lens part 122b collects light output from the first optical module 121-1 and the second optical module 121-2, light reflected by the second surface, that is, the lower surface of the base part 122a, and light reflected by the reflector sheet 123, and provides the collected light to the display panel 110.

According to an exemplary embodiment, the lens part 122b may be integrally formed with the base part 122a. That is, the lens part 122b may be formed on the first surface of the base part 122a through injection molding.

The first pattern part 122c includes patterns that are formed on the entire regions A1 and A2 of the lower surface of the light guide plate 122 in a certain shape to supply uniform light to the display panel 110.

According to an exemplary embodiment, the pattern of the first pattern part 122c induces total reflection in a region adjacent to the first optical module and the second optical module, and induces scattering in the remaining region except for the region adjacent to the optical module.

Such a first pattern part 122c may be formed by a laser processing, and embodied as various types, such as a dot pattern, a circular pattern, an elliptical pattern, a polygon pattern, and a hologram pattern.

The pattern may be formed on the second surface, that is, the lower surface of the light guide plate 122, through a printing scheme or injection molding.

The second pattern part 122d is formed on a periphery of the second surface adjacent to the remaining lateral side surfaces, except for the lateral side surfaces on which the optical modules are disposed, among the lateral side surfaces of the light guide plate 122.

That is, the second pattern part 122d is formed on the second surface, that is, the lower surface of the light guide plate 122, at the first region A1 having the fixing hole 122e formed thereon so as to scatter some of the incident light, thereby preventing the light bouncing from occurring on the boundary surface forming the fixing hole 122e and further preventing the dark portion from being generated between the adjacent fixing holes.

Such a second pattern part 122d may be formed by laser processing, and includes straight line patterns that extend from a first edge b1 to a second corner b2 on the first region A1, the straight line patterns being arranged from a third edge b3 to a fourth edge b4 (third edge b3 and fourth edge b4 also being referred to as long edges) connecting the first edge b1 to the second edge b2.

That is, according to an exemplary embodiment, the first pattern part and the second pattern part are formed by inwardly depressing the second surface of the light guide plate 122 by a laser processing.

Figure 6A:
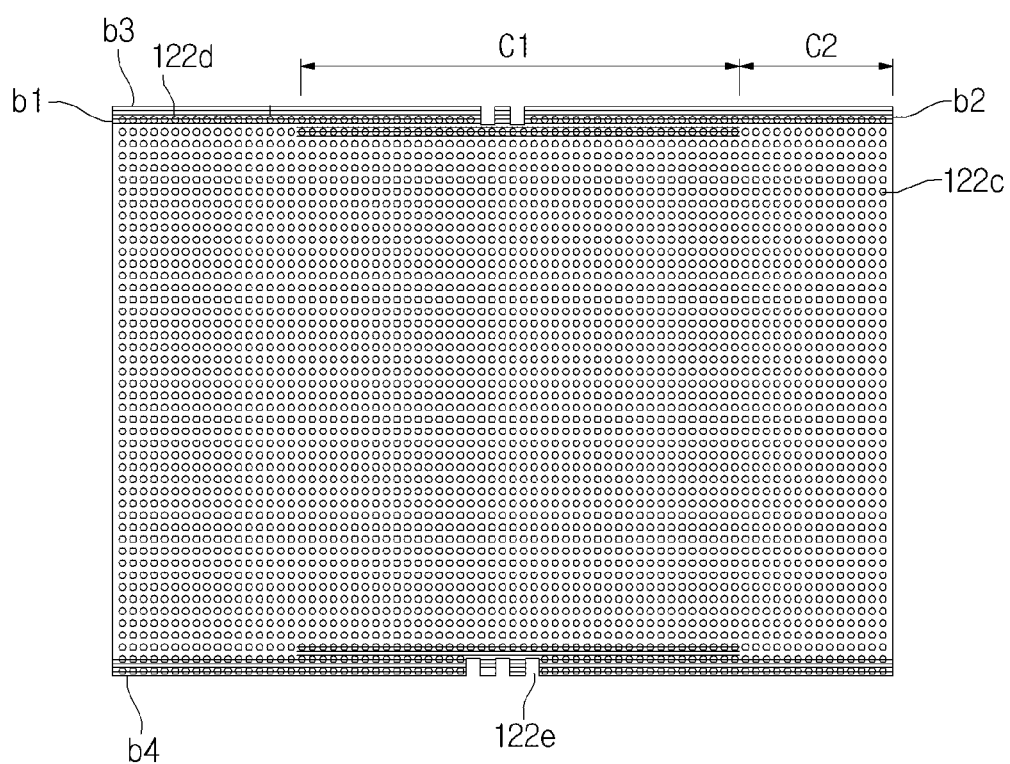
FIGS. 6A and 6B are bottom views illustrating the light guide plate of the backlight unit provided in the display device in accordance with an exemplary embodiment.

Referring to FIG. 6A, more of the straight line patterns of the second pattern part 122d are formed in a center portion C1 having the fixing hole 122e than in a region C2 adjacent to the first edge b1 and the second edge b2 (first edge b1 and second edge b2 also being referred to as short edges).

That is, the straight line patterns of the second pattern part 122d are concentrated on the center portion C1 having the fixing hole 122e.

The straight line pattern of the second pattern part 122d formed in the center portion C1 is spaced apart from the third edge b3 towards the inner side of the light guide plate 122 by a predetermined distance that is greater than a distance by which the fixing hole 122e is inwardly depressed from the third edge b3.

In addition, the straight line pattern of the second pattern part 122d formed in the center portion C1 is formed at a position spaced apart from the fourth edge b4 towards the inner side of the light guide plate 122 by a predetermined distance that is greater than a distance by which the fixing hole 122e is inwardly depressed from the fourth edge b4.

That is, the second pattern part 122d has an area larger than a formation region of the fixing hole 122e inwardly depressed from the light guide plate 122, and thereby accommodates the formation region of the fixing hole 122e.

Figure 6B:
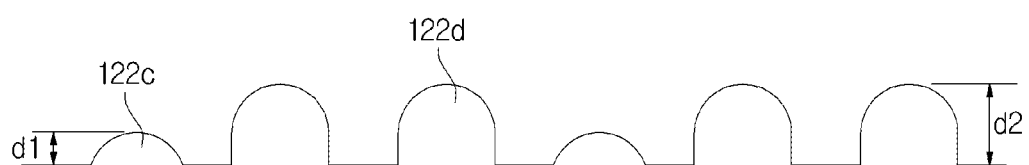

Referring to FIG. 6B, the first pattern part and the second pattern part are formed by inwardly depressing the second surface of the light guide plate 122, and in this exemplary embodiment, the first pattern part 122c has a depth d1 different from a depth d2 of the second pattern part 122d.

That is, the second pattern part 122d has the depth d2 which is deeper than the depth d1 of the first pattern part 122c. According to an exemplary embodiment, the depth d2 of the second pattern part 122d is about 1 mm, although is not limited thereto according to other exemplary embodiments.

In addition, the first pattern part and the second pattern part formed on the second surface of the light guide plate 122 may be formed as a double pattern in an overlapping manner. That is, the second pattern part may be formed on the first pattern part.

As described above, the first pattern part is formed on the first region and the second region of the second surface of the light guide plate 122, and the second pattern part is formed on the second region such that the amount of light introduced to the fixing hole 122e is reduced through the double pattern of straight lines, thereby reducing the amount of light dispersed at the fixing hole 122e. In addition, the light bounced at the fixing hole 122e is moderated by the light scattering that occurs due to the straight line double pattern. Through such a configuration, the brightness of the light guide plate 122 is provided to be uniform.

Hereinafter, the process of achieving a uniform brightness of the light guide plate 122 will be described with reference to FIGS. 7A and 7B.

Figure 7A:
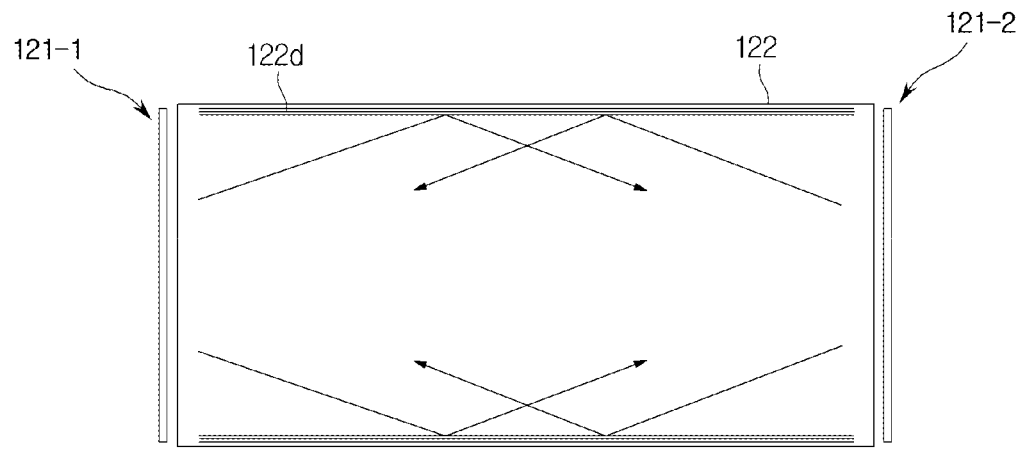

FIG. 7A is a drawing illustrating a light path when viewed from an upper side of the backlight unit according to an exemplary embodiment, and FIG. 7B is a drawing illustrating a light path when viewed from a lower side of the backlight unit according to an exemplary embodiment.

Referring to FIG. 7A, the straight line pattern of the second pattern part at the long edge serves to block and scatter light that is introduced from the optical module disposed at the short edge, to reduce the amount of light travelling toward the fixing hole 122e, thereby improving the light bouncing at the fixing hole 122e.

In this manner, the light absorbed by the straight line pattern of the second pattern part generally moderates the light bounced at the fixing hole 122e. That is, the straight line pattern of the second pattern part prevents the light bouncing phenomenon at the fixing hole 122e by scattering light.

Referring to FIG. 7B, light L1 at the first region adjacent to the fixing hole 122e represents light absorbed and scattered by the straight line pattern of the second pattern part, and light L2 at the second region represents light reflected by the straight line pattern.

In addition, the light guide plate prevents a bright line from being generated by having the straight line patterns formed at a higher density in the region adjacent to the fixing hole than the light incident surface onto which light is incident. Through such a configuration, a large amount of light is prevented from being reflected and scattered by the straight line pattern at the region adjacent to the light incident surface.

As described above, the light transmission path is guided, and thus the light leakage and light bouncing are canceled, thereby improving the image quality of a three dimension image.

Hereinafter, a method of forming the first pattern part 122c and the second pattern part 122d will be described.

The light guide plate 122 having the lens part 122b formed on the first surface thereon is disposed on a stage (not shown). The light guide pate 122 is disposed so as to have the first surface thereof come into contact with a surface of the stage while having the second surface thereof adjacent to a laser apparatus (not shown).

Thereafter, the laser apparatus (not shown) outputs laser light while moving at a first speed, thereby forming the first pattern part 122c on the first region and the second region of the second surface of the light guide plate 122.

Thereafter, after the forming of the first pattern part 122c is completed, the laser apparatus (not shown) outputs laser light while moving at a second speed in the first region A1 of the opposite two lateral side surfaces of the light guide plate 122 having the fixing hole 122e, to form the straight line patterns of the second pattern part 122d at the first region of the second surface of the light guide plate 122, in particular, so as to be concentrated on the region having the fixing hole 122e.

According to an exemplary embodiment, the first speed is a speed higher than the second speed.

Alternatively, the second pattern part 122d may be formed by moving the laser apparatus at a second speed in the first region, and then the first pattern part 122c may be formed at the second region by moving the laser apparatus at a first speed. The first speed may be a speed higher than the second speed.

Figure 8:
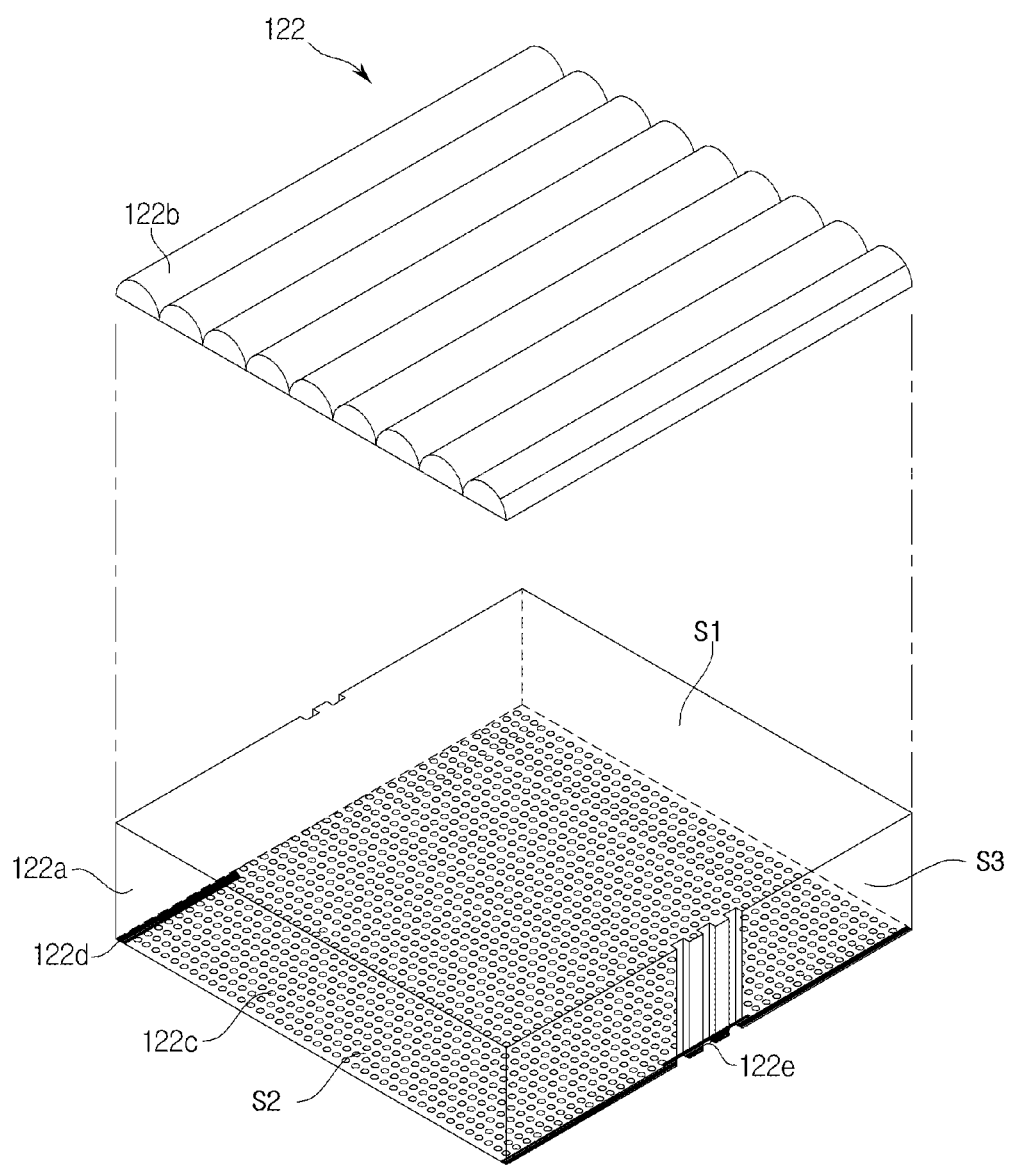
FIG. 8 is a perspective view illustrating a light guide plate of the backlight unit provided in the display device, illustrating another example of the light guide plate according to an exemplary embodiment.

FIG. 8 is a drawing illustrating a backlight unit provided in the display device, illustrating another example of the backlight unit according to an exemplary embodiment.

The light guide plate 122 includes the base part 122a, the lens part 122b disposed on a surface of the base part 122a, and the first pattern part 122c, the second pattern part 122d and the fixing hole 122e that are formed on another surface of the base part 122a.

The base part 122a and the lens part 122b are formed separately from each other while being disposed adjacent to each other.

The base part 122a of the light guide plate 122 includes the first surface S1, the second surface S2 and the lateral side surfaces S3 surrounding the peripheries of the first surface S1 and the second surface S2. The lateral side surfaces include four lateral side surfaces.

The base part 122a includes the first pattern part 122c and the second pattern part 122d that are formed on the second surface S2, and the fixing hole 122e formed on the lateral side surfaces S3 while extending from the first surface S1 to the second surface S2. According to an exemplary embodiment, the second surface S2 having the first pattern part 122c and the second pattern part 122d formed thereon is provided at an opposite side to the lens part 122b.

The lens part 122b is disposed adjacent to the first surface S1, that is, the upper surface of the base part 122a, and has a plurality of lens patterns arranged in the shape of bands adjacent to each other. The plurality of lens patterns forms a plurality of valley and hill shapes, and the hill shapes protrude from the first surface toward the display panel and are rounded.

The lens part 122b collects light output from the first optical module 121-1 and the second optical module 121-2, light reflected by the second surface, that is, the lower surface of the light guide plate 122, and light reflected by the reflector sheet 123, and provides the collected light to the display panel 110.

The lens part 122b is formed separately from the base part 122a.

The first pattern part 122c is formed on the entire regions A1 and A2 of the second surface, that is, the lower surface of the light guide plate 122, and includes a pattern provided in a predetermined shape to provide the display panel 110 with uniform light.

According to an exemplary embodiment, the pattern of the first pattern part 122c induces total reflection in the regions adjacent to the first optical module and the second optical module, and induces scattering in the remaining region except for the region adjacent to the optical modules.

Such a first pattern part 122c is formed by laser processing, and may embodied as various types of patterns, such as a circular pattern, an elliptical pattern, a polygon pattern, and a hologram pattern.

The pattern may be formed on the second surface, that is, the lower surface of the light guide plate 122, through a printing scheme or injection molding.

The second pattern part 122d is formed on the second surface, that is, the lower surface of the light guide plate 122, at the first region A1 having the fixing hole 122e formed thereon so as to scatter the incident light, thereby preventing the light bouncing from occurring on the boundary surface forming the fixing hole 122e while preventing the dark portion from being generated between the adjacent fixing holes.

The second pattern part 122d includes straight line patterns that are formed by laser processing, and extend from the first edge b1 to the second edge b2 while being arranged from the third edge b3 to the fourth edge b4 that are long edges connecting the first edge b1 to the second edge b2.

As described above, the first pattern part and the second pattern part are formed on the light guide plate 122, thereby allowing the light to travel in a straightforward fashion and thus maximize the LED scanning effect.

As is apparent from the above description, according to exemplary embodiments, the light bouncing and light leakage of the light guide plate of the display device having the edge-type backlight unit are prevented by using a laser processing technology without attaching black tape or using a bezel for blocking light, thereby ensuring an easy manufacturing process, improving the productivity of the display device, and improving the quality of the product while reducing the unit cost of manufacturing the product.

In addition, according to exemplary embodiments, the light incident onto the display panel may have a uniform brightness, and the displaying of three-dimensional content may be improved.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A display device comprising:
    a display panel;
    a backlight unit configured to output light to the display panel; and
    a lens part interposed between the display panel and the backlight unit, and configured to transmit the light output from the backlight unit,
    wherein the backlight unit comprises:
    an optical module configured to output the light; and
    a light guide plate configured to form a light path through which the light that is output from the optical module and incident on the light guide plate is transmitted and to scatter the incident light, the light guide plate comprising:
    a fixing hole;
    a first pattern part configured to scatter the incident light output from the optical module; and
    a second pattern part provided adjacent to the fixing hole and comprising straight line patterns,
    wherein more of the straight line patterns of the second pattern part are formed in a center portion of the light guide plate having the fixing hole than in a region of the light guide plate horizontally extending from the center portion to an edge of the light guide plate.

2. The display device of claim 1, wherein the light guide plate has a first region adjacent to the fixing hole and a second region excluding the first region such that light is scattered from the first region at an amount that is different than an amount that light is scattered from the second region.

3. The display device of claim 1, wherein the second pattern part is configured to reduce an amount of light propagating toward the fixing hole from a light incident surface of the light guide plate adjacent to the optical module, to thereby prevent a light bouncing phenomenon at the fixing hole.

4. The display device of claim 1, wherein:
    the first pattern part is configured to scatter the incident light; and
    the second pattern part is configured to scatter, reflect and absorb light incident to the fixing hole.

5. The display device of claim 1, wherein:
    the fixing hole is provided on an edge of the light guide plate other than an edge adjacent to the optical module among a plurality of edges of the light guide plate; and
    the second pattern part is a pattern provided along the edge having the fixing hole.

6. The display device of claim 1, wherein:
    the first pattern part and the second pattern part comprise depressions in a surface of the light guide plate; and
    the depressions of the second pattern part have a depth that is deeper than a depth of the depressions the first pattern part.

7. The display device of claim 6, wherein the first pattern part and the second pattern part are formed by laser processing.

8. The display device of claim 7, wherein:
    the first pattern part comprises a plurality of dot type patterns; and
    the second pattern part comprises a plurality of straight line type patterns.

9. The display device of claim 8, wherein the second pattern part comprises straight line type patterns having a density which increases from a light incident surface at which the light output from the optical module is incident toward a region adjacent to the fixing hole.

10. The display device of claim 7, wherein:
    the second pattern part is formed by performing the laser-processing at a speed slower than a speed at which the first pattern part is formed by performing the laser-processing.

11. The display device of claim 1, wherein the backlight unit further comprises a reflector sheet configured to reflect the light output from the optical module toward the light guide plate.

12. The display device of claim 11, wherein the first pattern part and the second pattern part are provided on a surface adjacent to the reflector sheet among surfaces of the light guide plate.

13. The display device of claim 1, further comprising:
    a prism sheet disposed between the backlight unit and the display panel and configured to collect light output from the backlight unit.

14. The display device of claim 1, further comprising:
    a reflective polarizing sheet disposed between the backlight unit and the display panel and configured to reflect a portion of the light output toward the display panel and to transmit the reflected light to the display panel.

15. The display device of claim 1, wherein the second pattern part has an area that is larger than an area in which the fixing hole is depressed in the light guide plate.

16. A display device comprising an edge-type backlight unit comprising a light guide plate and an optical module,
    wherein the light guide plate comprises:
    a base part comprising a first surface, a second surface opposite to the first surface, a plurality of lateral side surfaces surrounding the first surface and the second surface, and a fixing hole provided on a first lateral side surface among the plurality of lateral side surfaces,
    wherein the fixing hole comprises a depression in the first lateral side surface and extends from the first surface to the second surface, and the optical module is disposed at a second lateral side surface among the plurality of lateral side surfaces;

a lens part disposed on the first surface of the base part;

a first pattern part provided on the second surface of the base part; and a second pattern part provided at a region adjacent to the fixing hole, on the second surface of the base part.

17. The display device of claim 16, wherein:
the first lateral side surface is different from the second lateral side surface; and
the second pattern part comprises a straight line pattern provided at a periphery of the second surface adjacent to the first lateral side surface.

18. The display device of claim 17, wherein a length of the second lateral side surface is shorter than a length of the first lateral side surface.

19. The display device of claim 18, wherein the light guide plate comprises a third lateral side surface opposite the first lateral side surface and a fourth lateral side surface opposite the second lateral side surface, and a plurality of the fixing holes is formed in each of the first and third lateral side surfaces.

20. The display device of claim 19, wherein the plurality of fixing holes are formed at center positions of each of the first and third lateral side surfaces and are spaced apart from one another in the each of the center positions.

21. The display device of claim 20, wherein the second pattern part is formed at edges adjacent to the first lateral side and the second surface and the third lateral side and the second surface, respectively, and is formed to have a higher density in a region adjacent to the fixing hole compared to other regions of the light guide plate.

22. The display device of claim 16, wherein:
the first pattern part is formed by moving a laser apparatus disposed adjacent to the second surface of the light guide plate at a first speed; and
the second pattern part is formed by moving the laser apparatus at a second speed slower than the first speed.

23. The display device of claim 16, wherein:
the second pattern part is provided at a first region of the light guide plate adjacent to the fixing hole formed in the light guide plate; and the first pattern part is provided at the first region and a second region of the light guide plate excluding the first region.

24. The display device of claim 16, wherein:
the second pattern part is provided at a first region of the light guide plate adjacent to the fixing hole; and
the first pattern part is provided at a second region of the light guide plate excluding the first region.

25. The display device of claim 16, wherein:
the first pattern part is configured to scatter light incident from the optical module; and
the second pattern part is configured to scatter, reflect and absorb light incident to the fixing hole and form a light path for the light output from the optical module.

26. The display device of claim 25, wherein the second pattern part is configured to reduce an amount of light propagating toward the fixing hole from a light incident surface of the light guide plate adjacent to the optical module, thereby preventing a light bouncing phenomenon at the fixing hole.

27. A light guide plate comprising:
a top side, a bottom side opposite the top side, and lateral sides connecting the top side to the bottom side;
a hole formed in one of the lateral sides; and
depressions formed in an inward direction on the bottom side,
wherein a first group of the depressions is formed on the lateral side having the hole, a second group of the depressions is formed in a region excluding the lateral side having the hole, and the depth of the first group of the depressions is deeper than the depth of the second group of the depressions.

28. The light guide plate of claim 27, further comprising a lens part formed on the top surface.

29. The light guide plate of claim 28, wherein a surface of the lens part is shaped to include a plurality of valleys and a plurality of hills between the plurality of valleys.

30. The light guide plate of claim 29, wherein the lens part is integrally formed with the top surface.

31. The light guide plate of claim 29, wherein the lens part is detachably attached to the top surface.

* * * * *